(12) United States Patent
Ängquist et al.

(10) Patent No.: US 7,245,037 B2
(45) Date of Patent: Jul. 17, 2007

(54) WIND POWER FED NETWORK

(75) Inventors: Lennart Ängquist, Enköping (SE); Per Halvarsson, Västerås (SE); Lars Liljestrand, Västerås (SE); Stefan Valdemarsson, Lidköping (SE); Claes Bengtsson, Ludvika (SE); Willie Wong, Cary, NC (US)

(73) Assignee: ABB AB, Västerås (SE)

( * ) Notice: Subject to any disclaimer, the term of this patent is extended or adjusted under 35 U.S.C. 154(b) by 99 days.

(21) Appl. No.: 10/527,753

(22) PCT Filed: Sep. 13, 2002

(86) PCT No.: PCT/SE02/01664

§ 371 (c)(1),
(2), (4) Date: Sep. 28, 2005

(87) PCT Pub. No.: WO2004/025803

PCT Pub. Date: Mar. 25, 2004

(65) Prior Publication Data

US 2006/0214643 A1   Sep. 28, 2006

(51) Int. Cl.
*H02P 9/00* (2006.01)

(52) U.S. Cl. .............. 290/44; 290/55; 290/52; 322/29; 322/20; 322/28

(58) Field of Classification Search .......... 290/44, 290/55, 52; 322/29, 20, 28; 318/700, 729; 323/207
See application file for complete search history.

(56) References Cited

U.S. PATENT DOCUMENTS

| | | | |
|---|---|---|---|
| 4,695,736 A * | 9/1987 | Doman et al. ........... | 290/44 |
| 5,083,039 A * | 1/1992 | Richardson et al. ........ | 290/44 |
| 5,523,673 A | 6/1996 | Ratliff et al. | |
| 5,798,632 A * | 8/1998 | Muljadi .................. | 322/29 |
| 6,323,624 B1 * | 11/2001 | Henriksen ............... | 322/20 |
| 6,448,735 B1 * | 9/2002 | Gokhale et al. ........... | 318/700 |
| 6,680,856 B2 * | 1/2004 | Schreiber ................ | 363/71 |
| 6,984,898 B2 * | 1/2006 | Wobben ................. | 290/44 |
| 7,126,236 B2 * | 10/2006 | Harbourt et al. .......... | 290/44 |

FOREIGN PATENT DOCUMENTS

| | | |
|---|---|---|
| JP | 06178449 | 6/1994 |
| JP | 2000333373 A | 11/2000 |
| SU | 851626 A | 7/1981 |

* cited by examiner

*Primary Examiner*—Darren Schuberg
*Assistant Examiner*—Iraj A. Mohandesi
(74) *Attorney, Agent, or Firm*—Venable LLP; Eric J. Franklin

(57) ABSTRACT

An electric network for generation and transmission of electric power, including a power generating part, a point of common connection for the power generating part, a transmission link, a load network, and a reactive power compensator. The transmission link is coupled between the point of common connection and a grid connection point at the load network. The reactive power compensator is coupled to transmission link. The power generating part includes at least one wind turbine with an electric generator of induction type, coupled to the point of common connection. The reactive power compensator includes a capacitor bank and in parallel coupling to the capacitor bank a controllable inductor having a magnetic core, a main winding for alternating current, and a DC-control winding for direct current. The DC-control winding for control of the magnetic flux is set up by the main winding via orthogonal magnetization of the core.

11 Claims, 1 Drawing Sheet

WIND POWER FED NETWORK

TECHNICAL FIELD

The present invention relates to the use of a reactive power compensating means for compensation of reactive power in an electric network having a power generating part, a point of common connection for the power generating part, a transmission link, a load network, the transmission link coupled between the point of common connection and a grid connection point at the load network, wherein the reactive power compensating means is coupled to the transmission link.

It also relates to an electric network for generation and transmission of electric power, having a power generating part, a point of common connection for the power generating part, a transmission link, a load network, and a reactive power compensating means, the transmission link coupled between the point of common connection and a grid connection point at the load network, and the reactive power compensating means coupled to the transmission link.

BACKGROUND ART

A general description of wind power generation is to be found for example in the article Blaabjerg and Ned Mohan: Wind power, Wiley Encyclopedia of Electrical and Electronics Engineering, John Wiley & Sons, 1999, volume 23, pages 613–618, which article is hereby incorporated by reference.

A wind power plant usually comprises a plurality of windmills, each comprising a wind turbine mechanically coupled to an electric generator for conversion of the wind power to electric power. The wind turbines are, in dependence on the local wind conditions, distributed over a given area, typically in a number of parallel strings perpendicular to the prevailing wind direction, or where no such wind direction is to be found, in a grid layout.

A power collection system within the wind power plant is formed by coupling the generators along a string to a radial cable running along the string and connecting the radial cables to each other at a so called point of common connection (PCC).

The power generated by the wind power plant is supplied to a load network in the form of an electric power grid, for example a utility grid, having a rated frequency (usually 50 or 60 Hz) and a rated voltage that may typically be at the 132 kV level. Typically, the rated voltage at common connection is 22 kV and the point of common connection is then coupled to the power grid via a high voltage step-up power transformer.

Windmills may be divided into two categorises, i.e. fixed-speed and variable-speed mills, referring to whether the turbine and the rotor of the electric generator will operate at an at least substantially fixed rotational speed, determined by the frequency of the power grid, or operate with a variable rotational speed adapted to the actual wind conditions and the characteristics of the wind turbine.

Fixed-speed windmills may be equipped with some kind of synchronous generators, such as reluctance machines or conventional synchronous machines, but are, due to mechanical design considerations, more often equipped with induction generators.

Induction generators are of an uncomplicated design requiring only a minimum of control equipment, which also makes them attractive from an economical point of view. As they are usually designed with a low number of poles, typically 4 or 6, a mechanical gearbox is required to adapt the low rotational speed of the wind turbine to the speed of the generator.

The control equipment usually comprises only some starting equipment to limit the inrush current when the generator is connected to the power collection system.

However, induction generators cannot inherently generate reactive power, and the reactive power needed for their operation is thus provided by phase capacitors coupled to the stator windings of the generator.

The reactive power consumption of this type of generators is not controllable but dependent on the active power and on the voltage of the generator. Consequently, the exchange of reactive power with the grid to which the generator is coupled will vary substantially in dependence on the load of the generator, and the voltage of the network will exhibit corresponding voltage variations. These voltage variations are particularly considerable when the network is weak, i.e. has a low short circuit capacity.

The operator of the electric power grid usually has a requirement on the maximum level of the voltage supplied from the wind power plant. Usually all the generated electric power is supplied to the grid. In particular with increasing unit sizes of the windmills and with an increasing distance between the wind power plant and the grid, the voltage control at the point of common connection has been identified as a problem. The voltage rise, typically occurring at times of low grid load and high output power from the windmills, is dependent on the short circuit power at the point of common connection and in particular where the wind power plant is equipped with fixed-speed windmills, a situation may arise where it will be necessary to switch off a windmill in order to keep the voltage level within prescribed limits. This of course means an undesirable loss of energy.

Thus, in order to obtain an acceptable voltage control in the network, in particular when the network is weak, a controllable reactive power compensation means is required.

The mechanical torque of the wind turbine is subject to fluctuations, in particular to periodic fluctuations due to the design of the wind turbine, typically at a frequency in the order of 1–2 Hz, occasionally even below 1 Hz. A predominant source of such fluctuations is the so-called vortex interaction. However, for example imperfections in the gearbox may be the cause of fluctuations even in higher frequency ranges, typically in the order of up to 8 Hz.

Although the induction generators of a fixed-speed windmill have some inherent damping, such torque fluctuations will, due the consequential fluctuations in the rotational speed of the induction generator, cause fluctuations in the outputted active power of the generator, and, due to the inherent characteristic of such a generator, also in the reactive power exchange with the power collection system, thereby affecting the voltage quality of the electric power grid.

To obtain a control of reactive power flow that is fast enough to reduce voltage variations in the above mentioned frequency ranges, the reactive power compensation means preferably shall to be of the kind comprising one or more capacitor banks and a controllable inductor coupled in parallel with the capacitor banks.

In a known type of such compensator means, the inductor is connected in series with gate-controlled thyristors coupled in anti-parallel, whereby the susceptance of the inductor is controlled by the firing angle of the thyristors, so-called Thyristor Controlled Reactors (TCR).

However, such compensators generate, due to their operational principle, harmonics, which inter alia requires some kind of harmonic filtering to avoid that the harmonic currents are injected into the connected grid.

As mentioned above, in a wind park, a plurality of windmills are coupled to a so-called point of common connection. The voltage at this point of common connection is usually in the range of 10–30 kV. In cases where the power has to be transmitted over longer distances along a transmission link, the transmission link is preferably arranged to comprise a high voltage step-up transformer for increase of the transmission voltage to the range of 100–500 kV.

This limits the options for connection of a TCR, which, because of the thyristors comprised therein, is usually not connected directly, i.e. without a coupling transformer, to voltages higher than 36 kV.

SUMMARY OF THE INVENTION

It is an object of the invention to provide in an electric network having a power generating part that comprises at least one wind turbine with an electric generator of induction type, the use of a reactive power compensating means that can be directly connected even to voltages typical for transmission links, and the susceptance of which can be controlled without generation of harmonics.

It is another object of the invention to provide such use in an electric network having a load network which has a short circuit capacity that is lower than 10 times the rated power of the power generating part.

It is another object of the invention to provide an electric network having a power generating part comprising at least one wind turbine with an electric generator of induction type, a transmission link, and a load network, wherein a reactive power compensating means can be directly connected even to voltages typical for transmission links, and the susceptance of which can be controlled without generation of harmonics, According to the invention these objects are accomplished by providing a reactive power compensation means having at least one capacitor bank and in parallel coupling thereto a controllable inductor with a magnetic core, and wherein the susceptance of the inductor is controllable via orthogonal magnetization of the core.

BRIEF DESCRIPTION OF THE DRAWING

The invention will be explained in greater detail by description of embodiments with reference to the accompanying drawing, which is schematic and drawn as a combined block- and single line diagram, only showing main components which are of relevance for the understanding of the invention, and wherein.

DESCRIPTION OF PREFERRED EMBODIMENTS

Figure 1:
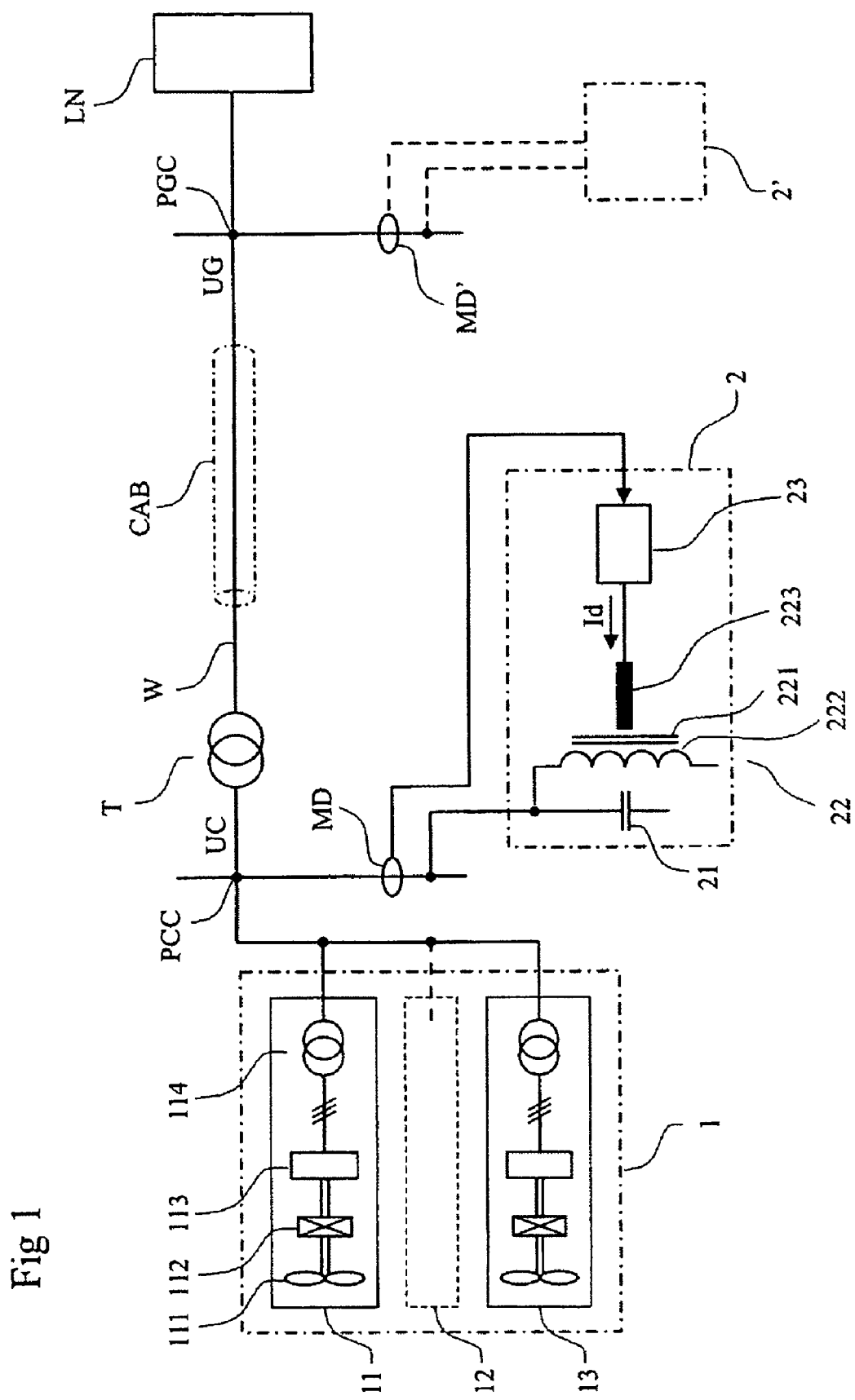
FIG. 1 shows a an embodiment of an electric network according to the invention.

The following description relates both to electric network and to the use of a reactive power compensating means.

FIG. 1 shows a three-phase electric network for generation and transmission of electric power, having a power generating part 1, a point of common connection PCC for the power generating part, a transmission link, a load network LN, and a reactive power compensating means 2.

The active power generated by the power generating part is supplied to the load network via the transmission link, that is coupled between the point of common connection and a grid connection point PGC at the load network.

The transmission link comprises a high voltage step-up transformer T with its low voltage side coupled to the point of common connection, and its high voltage side coupled to a transmission line W. The transmission line is at least to a part embodied as a cable CAB.

The power generating part comprises one or more, typically a plurality, of windmills, of which three are illustrated in the FIGURE with the designation numbers 11, 12, and 13.

The windmill 11 has a wind turbine 111, and a three-phase squirrel-cage induction generator 113. The generator is coupled to the wind turbine via a gear box 112. Electrically, the generator is coupled to the point of common connection via a step-up transformer 114. Although not shown in the FIGURE, the generator may be equipped with starting equipment as well with phase capacitors coupled to its stator windings for generation of reactive power during operation The windmills 12 and 13 are of similar kind as the windmill 11.

The active power output of the windmills may be controlled via a per se known pitch control system.

Typically, the output voltage of the generator is 690 V, and the voltage at the point of common connection 22 kV. The rated frequency of the network is usually 50 or 60 Hz.

The high voltage step-up transformer T typically has a ratio increasing the voltage at the transmission line W to 132 kV.

The reactive power compensating means is coupled to the transmission link at the point of common connection, and comprises a capacitor bank 21 and in parallel thereto an inductor 22 with controllable susceptance.

The over-all generation of reactive power of the reactive power compensating means is thus controllable to a desired level by reducing the reactive power generated by the capacitor bank with the controllable reactive power consumption of the inductor.

The inductor has a magnetic core 221, a main winding 222 for alternating current, and a DC-control winding 223 for direct current. By variation of the current Id fed into the DC-control winding, the magnetic flux set up by the main winding is influenced via orthogonal magnetization of the core, so-called cross magnetization.

An inductor of this kind is described for example in U.S. Pat. No. 4,393,157, which is hereby incorporated by reference.

The voltage UC at the point of common connection is sensed by a voltage sensing device MD and a value thereof is supplied to a controller 23, which in dependence on the deviation between a reference value for that voltage and its actual value outputs the current Id in such a way that the deviation goes towards zero.

When the geographical distance between the power generating part and the load network is great, and in particular in cases where the power generating part is located offshore, and the transmission line thus will comprise a submarine cable CAB, it might be advantageous to locate at and couple the reactive power compensating means to the grid connection point.

This alternative localization of the reactive power compensating means is in the FIGURE indicated with the box labelled 2'.

The reactive power compensating means 2' is similar to the one described above, however, designed for connection to the voltage at the grid connection point. In this case, a voltage sensing device MD' senses the voltage at the grid connection point and supplies a value thereof to the controller 23.

The following advantages are achieved by the invention.

The harmonics generated by the reactive power compensation means are very low.

The reactive power compensation means may be connected to voltage levels that typically are used in transmission systems In particular when the load network is weak, which in this context means that the load network has a short circuit capacity that is lower than 10 times the rated power of the power generating part, a reactive compensator means of the kind described above will significantly improve the voltage quality of the electric network.

In situations such as a earth fault somewhere in the network, for example in the load network, the induction type generators might lose their magnetization due to the decreased voltage, and as a consequence thereof increase their rotational speed. After clearing of the fault, the voltage will return in the network. In such a situation, reactive power has to be rapidly supplied to the windmills, which can easily be supplied by a system according to the invention.

It shall be understood that, although not particularly shown in the FIGURE, embodiments of the transmission link without any step-up transformer, and where it is embodied only as conductors directly connecting the point of common connection to the point of grid connection, are within the scope of the claims.

The invention claimed is:

1. An electric network for generation and transmission of electric power, comprising a power generating part, a point of common connection for the power generating part, a transmission link, a load network, and a reactive power compensating means, the transmission link coupled between the point of common connection and a grid connection point at the load network, and the reactive power compensating means coupled to transmission link, wherein the power generating part comprises at least one wind turbine with an electric generator of induction type, coupled to the point of common connection, and wherein the reactive power compensating means comprises a capacitor bank and in parallel coupling to said capacitor bank a controllable inductor having a magnetic core, a main winding for alternating current, and a DC-control winding for direct current, said DC-control winding for control of the magnetic flux set up by the main winding via orthogonal magnetization of the core.

2. The electric network according to claim 1, wherein the reactive power compensating means is coupled to the point of common connection.

3. The electric network according to claim 1, wherein the transmission link comprises a high voltage step-up transformer with its low voltage side coupled to the point of common connection, wherein the reactive power compensating means is coupled to said grid connection point at the load network.

4. The electric network according to claim 3, wherein the power generating part is located off-shore and in that the transmission link comprises a sub-marine cable.

5. The electric network according to claim 1, wherein the load network has a short circuit capacity that is lower than 10 times the rated power of the power generating part.

6. The electric network according to claim 1, wherein the reactive power compensating means comprises a controller for generating the direct current for said DC-control winding in dependence on a voltage sensed at the reactive power compensating means.

7. Use of a reactive power compensating means for compensation of reactive power in an electric network having a power generating part with at least one wind turbine with an electric generator of induction type, a point of common connection for the power generating part, a transmission link, a load network, the transmission link coupled between the point of common connection and a grid connection point at the load network, and the reactive power compensating means coupled to the transmission link, the reactive power compensating means having a capacitor bank and in parallel coupling to said capacitor bank a controllable inductor with a magnetic core, a main winding for alternating current, and a DC-control winding for direct current, said DC-control winding for control of the magnetic flux set up by the main winding via orthogonal magnetization of the core.

8. The use of a reactive power compensating means for compensation of reactive power in an electric network according to claim 7, wherein the reactive power compensating means is coupled to the point of common connection.

9. The use of a reactive power compensating means for compensation of reactive power in an electric network according to claim 7, wherein the transmission link comprises a high voltage step-up transformer with its low voltage side coupled to the point of common connection and wherein the reactive power compensating means is coupled to said grid connection point at the load network.

10. The use of a reactive power compensating means for compensation of reactive power in an electric network according to claim 9, wherein the power generating part is located off-shore and wherein the transmission link comprises a sub-marine cable.

11. The use of a reactive power compensating means for compensation of reactive power in an electric network according to claim 7, wherein the load network has a short circuit capacity that is lower than 10 times the rated power of the power generating part.

* * * * *